(12) United States Patent
Gajdzinski et al.

(10) Patent No.: US 10,268,978 B2
(45) Date of Patent: Apr. 23, 2019

(54) METHODS AND SYSTEMS FOR INTELLIGENT ENTERPRISE BILL-OF-PROCESS WITH EMBEDDED CELL FOR ANALYTICS

(71) Applicant: Dassault Systemes Americas Corp., Waltham, MA (US)

(72) Inventors: Grzegorz Gajdzinski, Long Beach, CA (US); Minh Tuan Nguyen, Westminster, CA (US); Nicholas Schleich, Huntington Beach, CA (US)

(73) Assignee: Dassault Systemes Americas Corp., Waltham, MA (US)

(*) Notice: Subject to any disclaimer, the term of this patent is extended or adjusted under 35 U.S.C. 154(b) by 717 days.

(21) Appl. No.: 14/587,553

(22) Filed: Dec. 31, 2014

(65) Prior Publication Data

US 2016/0189078 A1 Jun. 30, 2016

(51) Int. Cl.
*G06Q 10/06* (2012.01)
(52) U.S. Cl.
CPC .............. *G06Q 10/06375* (2013.01)
(58) Field of Classification Search
CPC ............................................. G06Q 10/06375
See application file for complete search history.

(56) References Cited

U.S. PATENT DOCUMENTS

| | | | |
|---|---|---|---|
| 4,862,376 A | 8/1989 | Ferriter et al. | |
| 5,555,406 A | 9/1996 | Nozawa | |
| 5,576,965 A | 11/1996 | Akasaka et al. | |
| 5,579,231 A | 11/1996 | Sudou et al. | |
| 5,761,674 A | 6/1998 | Ito | |
| 6,108,662 A | 8/2000 | Hoskins et al. | |
| 6,177,942 B1 | 1/2001 | Keong et al. | |
| 6,295,513 B1 | 9/2001 | Thackston | |
| 7,134,096 B2 | 11/2006 | Brathwaite et al. | |

(Continued)

OTHER PUBLICATIONS

Kestel "Risk Identification and Mitigation through Process Potential Failure" (2012) (retrieved from http://www.mwcmc.org/resources/documents/01-06-02_kestel_pfmea_at_orbital_sciences.pdf).*

(Continued)

*Primary Examiner* — Sujay Koneru
(74) *Attorney, Agent, or Firm* — Armstrong Teasdale LLP

(57) ABSTRACT

A method and a system for organizing management information within an enterprise are provided. The method includes storing an enterprise bill of process (eBOP) comprising a plurality of enterprise process events and at least one respective threshold for each enterprise process event in an information engine and receiving enterprise process data relating to the plurality of enterprise process events from an information engine. The enterprise process data includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. The method further includes generating immediate actions directing subscribed parties to perform determined remedial procedures of an action plan.

20 Claims, 6 Drawing Sheets

(56) References Cited

U.S. PATENT DOCUMENTS

| | | | |
|---|---|---|---|
| 7,712,058 B2 | 5/2010 | Brathwaite et al. | |
| 8,806,398 B2 | 8/2014 | Brathwaite et al. | |
| 2003/0187763 A1* | 10/2003 | Jordan | G06Q 30/02 705/35 |
| 2005/0216429 A1 | 9/2005 | Hertz et al. | |
| 2006/0089939 A1* | 4/2006 | Broda | G06F 17/3056 |
| 2007/0078553 A1* | 4/2007 | Miwa | G06F 17/50 700/97 |
| 2007/0106642 A1* | 5/2007 | Kovrigin | G06Q 10/06 |
| 2007/0192715 A1* | 8/2007 | Kataria | G06Q 10/06 715/764 |
| 2008/0313596 A1 | 12/2008 | Kreamer et al. | |
| 2009/0327023 A1 | 12/2009 | Nanji | |
| 2011/0029824 A1 | 2/2011 | Scholer et al. | |
| 2012/0150570 A1* | 6/2012 | Samad-Khan | G06Q 10/0635 705/4 |
| 2013/0080207 A1 | 3/2013 | Lyras | |
| 2013/0332240 A1* | 12/2013 | Patri | G06Q 10/06 705/7.36 |
| 2014/0074629 A1 | 3/2014 | Rathod | |
| 2014/0089224 A1* | 3/2014 | Brown | G06Q 10/06 705/348 |
| 2014/0364985 A1* | 12/2014 | Tiwari | G06F 17/50 700/107 |

OTHER PUBLICATIONS

Sly "Manufacturing Process Management (MPM)" (2004) (retrieved from http://www.proplanner.com/documents/filelibrary/documents/papers_case_studies/MPM_Whitepaper_Tech_Trend_PDF_CDF4B29897EE8.pdf).*

* cited by examiner

METHODS AND SYSTEMS FOR INTELLIGENT ENTERPRISE BILL-OF-PROCESS WITH EMBEDDED CELL FOR ANALYTICS

BACKGROUND

This disclosure relates generally to organizing management information and, more particularly, to creating and disseminating action plans for future events.

Current trends in the manufacturing environment increase the weight of collaboration in the manufacturing process. While developing information and processes has always been important in the manufacturing process, with recent emphasis on the convergence of IT and the manufacturing process, leading organizations have begun taking collaboration to the next level.

An example of these trends is the Enterprise Bill of Process (eBOP). With increasingly capable IT infrastructures, the Bill of Process (BOP), is becoming a global consideration in Manufacturing Operations Management (MOM) and Product Lifecycle Management (PLM). The resulting eBOP, a best practices template for production, is creating a place for cross-functional teams to share information and collaborate in ways that weren't possible before.

The resulting shift toward process-centric management of workflows across the enterprise using eBOP is similar to taking a Business Process Management (BPM) approach on the shop floor.

At least some known manufacturing processes begin with a product idea that is first visualized with an engineering design, followed by the creation of a Bill of Materials (BOM). The BOM is a list of parts and materials needed to make a product, and, without it, manufacturing would be impossible. But the BOM is only part of the product equation. It shows "what" to make, not "how" to manufacture it, leaving the rest up to the BOP.

During the design process, engineers create a design-oriented parts list, i.e., eBOM, which represents how engineering views the product. Manufacturing engineers restructure the eBOM into a process-oriented mBOM (commonly known as a Bill of Process—BOP). It will show how the product will be made, and simultaneously create the sequence of steps to produce a part and the required resources—work centers, tools and skills.

The BOP is comprised of detailed plans explaining the manufacturing processes for a particular product. Within these plans resides in-depth information on machinery, plant resources, equipment layout, configurations, tools, and instructions. Traditionally, companies with many plants and processes have only informal BOPs for each location, or for each product or manufacturing line at a location. Changes to the BOP are communicated to the rest of the enterprise during periodic meetings of the interested parties and it is typical for the process to take a long time and a lot of man/hours. There is a lack of efficiency, scalability, and visibility in this methodology.

There have been many attempts to bring data and activities from PLM and MOM together within the so-called "Digital Manufacturing" discipline. An example is a concept to combine the eBOP and BPM (Business Process Management) to act as an integration platform between Engineering and Manufacturing Operations. There are also many collaboration platforms, but these are very generic social platforms and do not provide process management capabilities.

Global Manufacturing enterprises have invested heavily in operational excellence practices for many years, wringing the inefficiencies out of every operation in the production process. Supply chains have been tightened, inventories reduced or virtually eliminated with just-in-time processing, and production operations at every stage streamlined and optimized.

But there is one area in the lean revolution that often is not Considered—not because it doesn't matter, but because it has been so difficult to deliver a solution. That neglected area is the management decision-making process. For example, consider a global manufacturer that has practiced continuous improvement for a period of time. During that time, products roll off the assembly line with precision. The quality team is successfully managing a quality of production worldwide, so yields are consistently high. Warehouses operate at top efficiency. And then, a supplier problem develops such as, a key component begins trending out of specification. The response of the global manufacturer to this problem depends on the managers who have responsibility, how quickly can they identify the problem, whether corrective action procedures are in place, how quickly they correct the problem, and how accurately.

A main challenge is how to get the optimal inter-cooperation out of the key enterprise process domains and let the results drive the relevant business decision processes within a social collaborative environment:

Enterprise Resource Planning (ERP)—as the highest financial and commercial system domain.

Product Lifecycle Management (PLM)—or the Global Engineering system domain.

Manufacturing Operations Management (MOM) or Global Production Management system domain.

There are already many attempts to bring these domains to cooperate together, but the focus is mainly on how to make these extremely isolated systems (ERP, PLM, MOM) exchange their data efficiently. In general, these efforts focused mainly on the system interface or interconnection, with some use-cases or business scenarios demonstrating the benefits of those data sharing or exchange. There are many attempts to bring data and activities from PLM and MOM together within the so-called "Digital Manufacturing" discipline.

There are several concepts to make the combined eBOP (Enterprise Bill-Of-Process) and MOM (Manufacturing Operations Management) acting as platform for data interchange between both domains—but these efforts don't involve Business Process Management. There are also generic collaboration frameworks in the market—like Yammer, Jive etc. But, these are only generic frameworks and there is no workflow or procedure involved for the collaborative decision-making. There is no concept or real-world practice that addresses the holistic interoperability for key decision-makers in the global enterprise and covering all enterprise domains with global governance from the BPM point of view. Known attempts provide only narrow-scope interconnections between ERP, PLM, and MOM systems and mainly focus on data exchange.

BRIEF DESCRIPTION

In one aspect, a computer-implemented method for organizing management information within an enterprise includes storing an enterprise bill of process (eBOP) comprising a plurality of enterprise process events and at least one respective threshold for each enterprise process event in an information engine and receiving enterprise process data relating to the plurality of enterprise process events from an information engine. The enterprise process data includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. The method further includes generating immediate actions directing subscribed parties to perform determined remedial procedures of an action plan.

In another aspect, a computing device for an intelligent enterprise bill-of-process (IEBOP) system comprising an embedded analytics cell, includes one or more processors communicatively coupled to one or more memory devices wherein the one or more memory devices includes computer-executable instructions that when executed by the one or more processors cause the one or more processors to store an intelligent enterprise bill of process (IEBOP) comprising a plurality of enterprise process events and at least one respective threshold for each enterprise process event in an information engine. The IEBOP is stored in a business objects database. The computer-executable instructions further cause the one or more processors to receive enterprise process data from an information engine, the enterprise process data relating to the plurality of enterprise process events wherein the enterprise process data includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. The computer-executable instructions further cause the one or more processors to generate immediate actions that direct subscribed parties to perform determined remedial procedures of an action plan and receive reports from the subscribed parties of progress of implementation of the action plan.

In yet another aspect, at least one non-transitory computer-readable storage media having computer-executable instructions embodied thereon is provided. When executed by at least one processor, the computer-executable instructions cause the processor to store an enterprise bill of process (eBOP) comprising a plurality of enterprise process events and at least one respective threshold for each enterprise process event in an information engine, the eBOP stored in a business objects database and receive enterprise process data from an information engine, the enterprise process data relating to the plurality of enterprise process events. The enterprise process data includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. The computer-executable instructions further cause the processor to generate immediate actions that direct subscribed parties to perform determined remedial procedures of an action plan.

BRIEF DESCRIPTION OF THE DRAWINGS

FIG. 1 is a schematic block diagram of an enterprise having a business goal in accordance with an example embodiment of the present disclosure.

FIG. 2 illustrates a block diagram of an implementation of a cross domain traveling intelligent cell (TIC) in an enterprise resource planning environment.

FIG. 3 is a schematic block diagram of intelligent enterprise Bill of Process (IEBOP) as part of an enterprise bill of material (BOM).

FIG. 4 is a flow chart of a computer-implemented method for organizing management information within an enterprise in accordance with an example embodiment of the present disclosure.

FIG. 5 is a block diagram of an exemplary intelligent enterprise bill-of-process (IEBOP) system used to facilitate communication of enterprise process data between managers of various entities within an enterprise.

FIG. 6 shows an exemplary configuration of a database within a computing device, along with other related computing components, that may be used for organizing management information within an enterprise.

DETAILED DESCRIPTION

Figure 1:
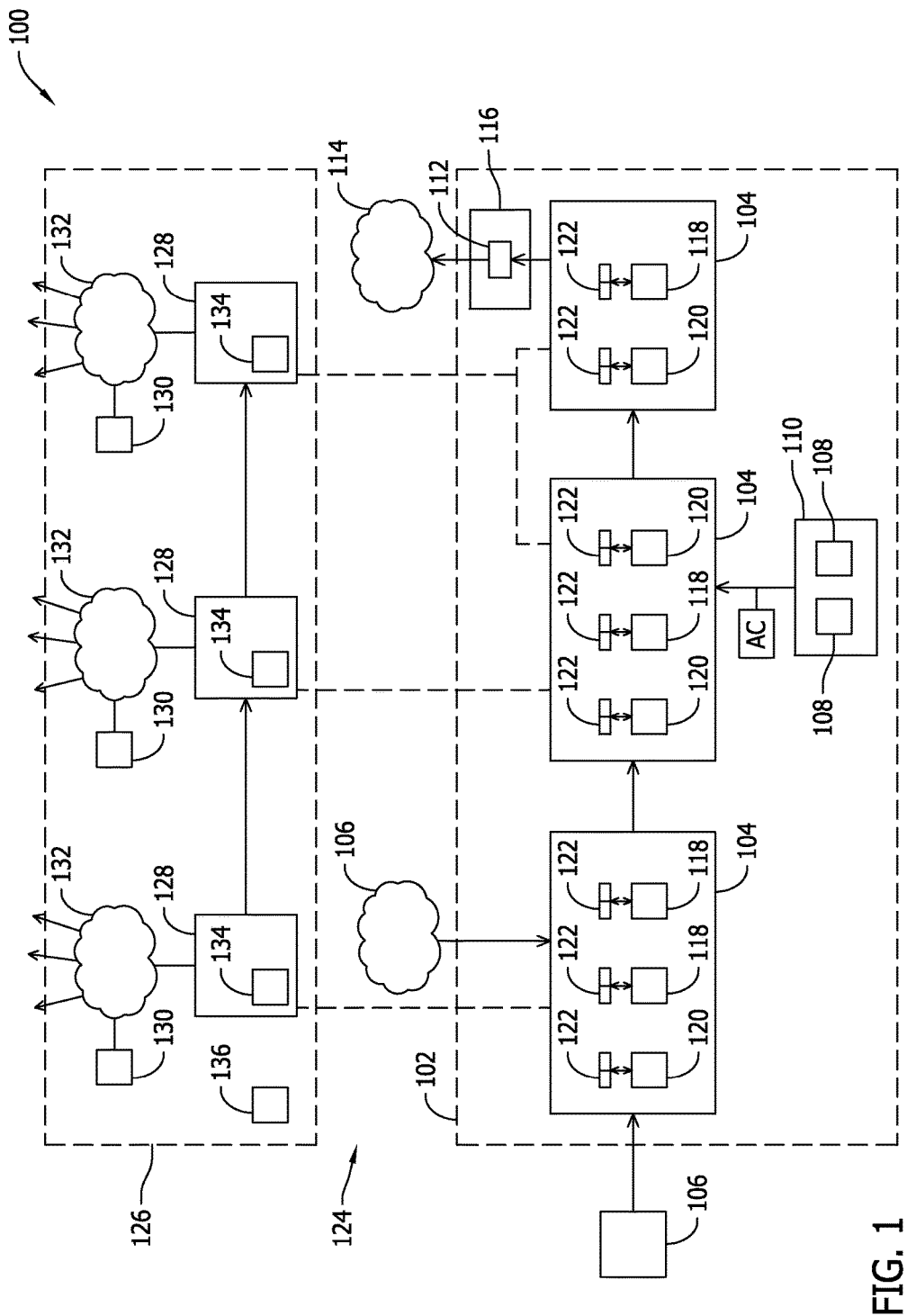
FIGS. 1-6 show exemplary embodiments of the methods and systems described herein.

The following detailed description illustrates embodiments of the disclosure by way of example and not by way of limitation. It is contemplated that the disclosure has general application to managing communication in an enterprise.

Enterprise resource planning (ERP) is typically implemented in business process management software that allows an organization to use a system of integrated applications to manage the business and automate many back office functions related to technology, services and human resources. ERP software integrates all facets of an operation, including product planning, development, manufacturing, sales and marketing.

ERP software is considered an enterprise application as it is designed to be used by larger businesses and often requires dedicated teams to customize and analyze the data and to handle upgrades and deployment. In contrast, Small business ERP applications are lightweight business management software solutions, customized for the business industry you work in.

In industry, product lifecycle management (PLM) is the process of managing the entire lifecycle of a product from inception, through engineering design and manufacture, to service and disposal of manufactured products.

Manufacturing operations management (MOM) is a methodology for viewing an end-to-end manufacturing process with a view to optimizing efficiency.

Manufacturing Execution Systems (MES) are computerized systems used in manufacturing. MES can provide the right information at the right time and show the manufacturing decision-maker how the current conditions on the plant floor can be optimized to improve production output. MES work in real time to enable the control of multiple elements of the production process (e.g. inputs, personnel, machines and support services).

MES might operate across multiple function areas, for example: management of product definitions across the product life-cycle, resource scheduling, order execution and dispatch, production analysis for Overall Equipment Effectiveness (OEE), and materials track and trace.

The idea of MES might be seen as an intermediate step between, on the one hand, an Enterprise Resource Planning (ERP) system, and a Supervisory Control and Data Acquisition (SCADA) or process control system on the other; although historically, exact boundaries have fluctuated.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment of the present disclosure, a computer program is provided, and the program is embodied on a computer readable medium. In an exemplary embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

Embodiments of the present disclosure facilitate "harmonizing" the different needs of various stakeholders and handles core business processes such as Plan-Do-Check-Act (PDCA) and Corrective and Preventive Action (CAPA) requirements in a harmonized closed-loop manner. Embodiments of the intelligent enterprise bill-of-process (IEBOP) including an embedded cell for analytics focuses on the entire scope of a global enterprise business management decision-making process.

The framework of the IEBOP is fully integrated with the Enterprise Business Process Management platform and both will form a Cross-Domain Enterprise Collaborative Decision Management System, which depends on information being timely made available to each decision-maker in the enterprise during all states of the operation of the enterprise. The Cross-Domain Enterprise Collaborative Information system facilitates such availability.

Global manufacturers have complex supply chains and multiple plants that often capture data in different ways and report in different formats. Such data has to be gathered, transformed, cleaned, stored and analyzed, and then delivered to each person in the enterprise who needs it, in a form appropriate for their role.

The plant manager may spot a problem quickly, based on local data. However, a regional problem that is only apparent when looking at aggregated data may take longer to detect. Although traditional enterprise business systems may be able to provide managers with aggregated global manufacturing reports on a weekly basis. However, such periodicity is not acceptable. During a period of a week, for example, faulty products can ship, quality teams can get bogged down with testing, and warehouses can accumulate parts waiting for a management decision.

IEBOP manages a holistic interoperability for key decision-makers in the global enterprise and covering predetermined enterprise domains with global governance from a Business Process Management (BPM) point of view. Known attempts at such interoperability provide only narrow-scope interconnections between ERP, PLM, and MOM systems and mainly focus on data exchange rather than cross-domain, collaborative decision management based on enterprise information intelligence and eBPM. IEBOP provides an innovative and holistic system based on "self-configured and domain-enriched traveling intelligent cells (TIC)" across three main domains (ERP, PLM, MOM) under (Business Process Management) BPM governance. IEBOP further provides the interoperability framework that involves all key global enterprise domains: ERP, PLM/Engineering, MOM/Production.

The interoperability framework of IEBOP facilitates information sharing, but also includes a formal social collaboration process for use by decision-makers and other knowledge stakeholders from a Global Business Process Management and Governance point-of-view.

An information engine including machine learning and a predictive analysis capability, specifically supervised learning, facilitates providing action suggestions and accurate estimates of time and labor for correcting the problem. The information engine cooperates with a Collaborative Enterprise Process Engine that ensures the relevant business making workflows are implemented and managed in the global collaborative environment. A self-configured and automatic enriched traveling intelligent cell (TIC) is instantiated in each enterprise domain to provide significant information selection, analysis, and presentation to the proper decision-makers.

FIG. 1 is a schematic block diagram of an enterprise 100 having a business goal in accordance with an example embodiment of the present disclosure. In the example embodiment, enterprise 100 includes an enterprise organization 102 that includes a plurality of entities 104. Entities 104 may include various facilities, such as, but not limited to shipping and receiving facilities, office facilities, manufacturing facilities, including discrete manufacturing facilities, departments, such as, but not limited to human resources, engineering, accounting and other entities that facilitate the design, operation, maintenance, and management of enterprise 100. Enterprise 100 also includes an input of raw materials 106, parts and/or components 108 received from a contractor or supplier 110, and product 112, which is output to customers 114 through a shipping entity 116.

In some cases, at least some of entities 104 may include machines 118 and/or processes 120 that are monitored by a data acquisition system and/or a control system such as, a distributed control system (DAS/DCS) 122. Each of DAS/DCS 122 typically include a computing device having a processor and a memory. DAS/DCS 122 are networked together and to a supervisory control and data acquisition (SCADA) system 124, of which an intelligent electronic bill of process (IEBOP) system 126 may be a part. IEBOP system 126 is a computer-implemented system that facilitates organizing management information within an enterprise. Overall control of the management information system of the enterprise may be by an enterprise resource planner (ERP) (not shown) and IEBOP may form a part of the ERP or be communicatively coupled to it. In the example embodiment, IEBOP system 126 includes a plurality of enterprise process event monitors 128 and at least one respective threshold for each enterprise process event monitor 128 in an associated information engine 130. Enterprise process event monitors 128 are communicatively coupled to one or more IEBOP communication networks 132, which permit specified enterprise process event monitors 128 to communicate with each other and enterprise 100. Enterprise process event monitors 128 are configured to receive enterprise process data relating to the plurality of enterprise process event monitors 128 from information engine 130. The enterprise process data includes historical data relating to the enterprise process events being monitored, real-time current information relating to the enterprise process events, and predicted data based on the historical data, the current data and measured or derived parameters associated with the at least some of the plurality of enterprise process events, and algorithmic models of at least one of the enterprise process events including parameters, variables, and measurements. Real-time production process data includes one or more of maintenance process data, quality process data, warehouse process data, logistic process data, labor process data, safety process data, and security process data from a plurality of entities within the enterprise, wherein the plurality of entities includes third party contractors to the enterprise. In various embodiments, the enterprise process events include at least one production process event, a maintenance process event, a quality process event, a warehouse process event, a logistic process event, a labor process event, a safety process event, and a security process event. The enterprise process data is analyzed and compared to the stored thresholds to generate immediate actions directing subscribed parties to perform determined remedial procedures of an action plan. Subscription information is received from enterprise parties for each enterprise process event that the enterprise parties are to be informed of Information relating to enterprise process events for which the enterprise parties are subscribed and which have exceeded a respective threshold value is periodically transmitted to the affected enterprise parties. The immediate actions are preplanned responses to off-normal or errant behavior of one or more of machines 118 and processes 120. The immediate actions direct subscribed parties to perform determined remedial procedures of an action plan and to report a status of implementation of previously transmitted immediate actions. The immediate actions are performed by a manager's organization and the manager updates the associated enterprise process event monitor 128, which causes reporting of the updates to IEBOP system 126 and subsequent notification of subscribed users.

At least one analytics cell 134 associated with each of the plurality of enterprise process events is generated for each machine or process included within a respective enterprise process event monitor 128. Analytics cell 134 is configured to monitor an operation of an associated machine 118 or process 120, analyze the operation of machine 118 or process 120 based on analytic rules received from at least one of information engine 130 and an IEBOP supervisory engine 136 communicatively coupled to analytics cell 134.

Figure 2:
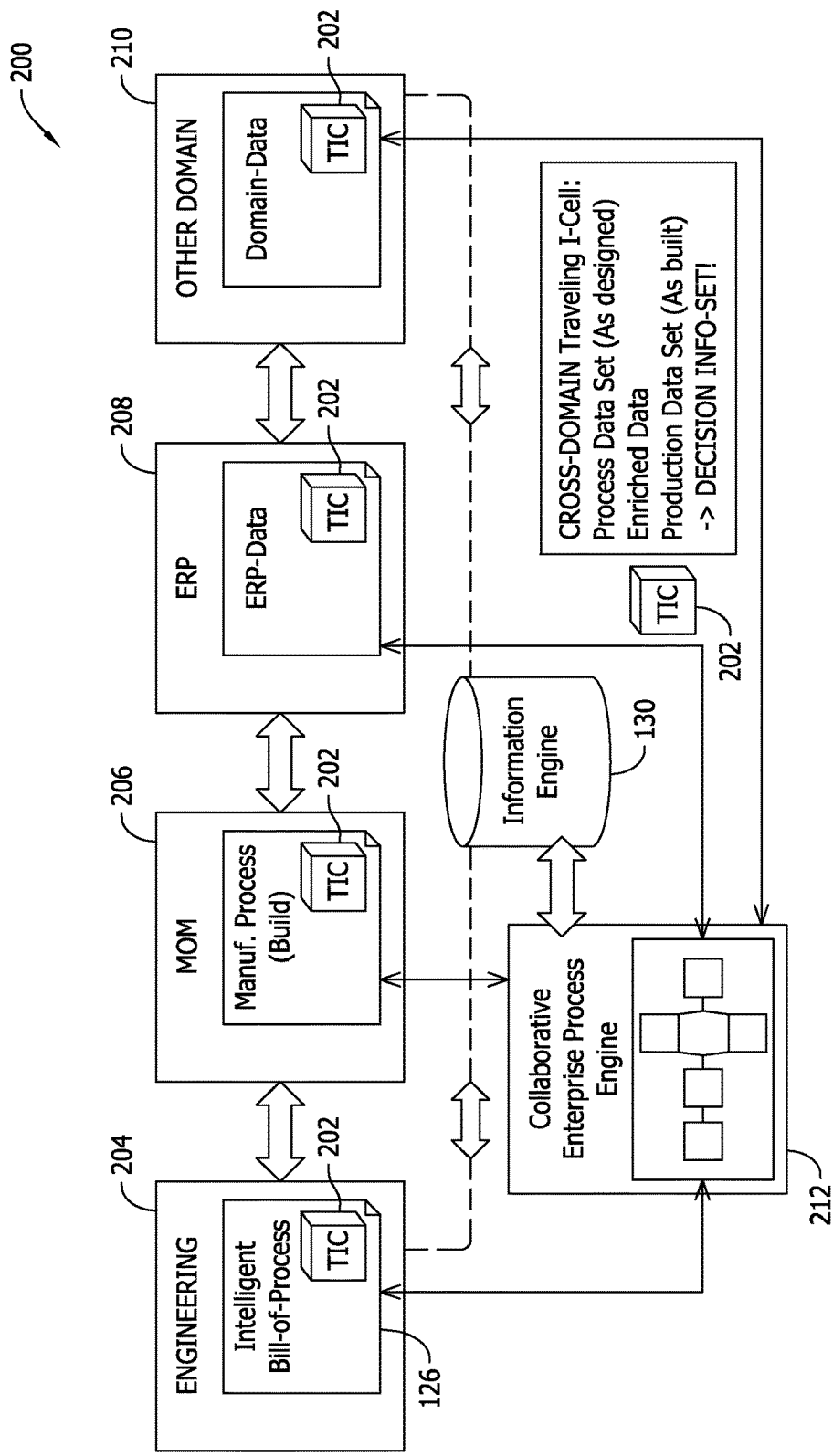

FIG. 2 illustrates a block diagram of an implementation of a cross domain traveling intelligent cell (TIC) 202 in an enterprise resource planning environment 200. In the example embodiment, environment 200 includes an engineering domain 204, a manufacturing operations management (MOM) domain 206, an enterprise resources domain 208, and may be extended to include other existing domains 210 and/or other future domains (not shown). TIC 202 is self-configured and automatically enriched traveling intelligent cell instantiated in each enterprise domain. Information engine 130 supports a collaborative enterprise process engine 212 that ensures the relevant business making workflows are implemented and managed in a global collaborative environment and across all domains.

Figure 3:
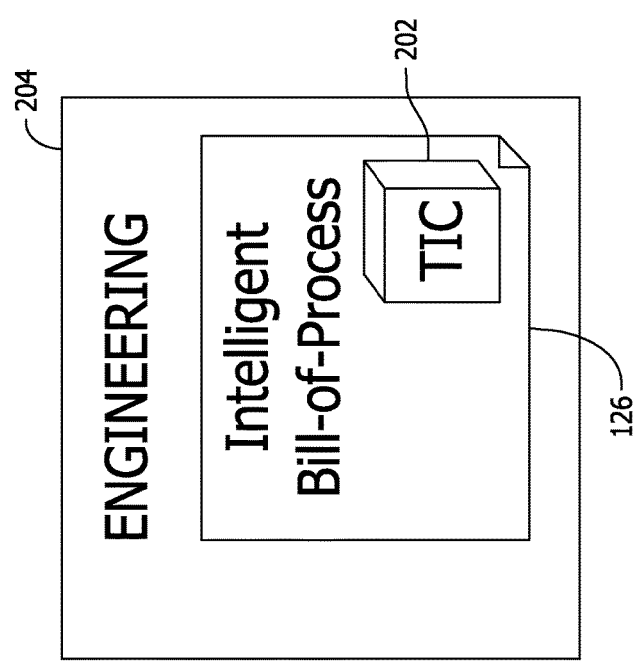

FIG. 3 is a schematic block diagram of intelligent enterprise Bill of Process (IEBOP) 126 as part of an enterprise bill of material (BOM). IEBOP 126 is the generative container of TIC 202. TIC 202 contains three parts, a generic equipment and process data set, a specific equipment and process data set, and a dynamic deployment data set that relates to at least one of a facility domain, a resource domain, and a user domain.

Collaborative scenarios with collaborative features of collaborative enterprise process engine 212 include, for example, a predictive algorithm that provides relevant information on experts who can help solving current issues. The "subscribe" feature can be used to remember or "bookmark" these experts. A predictive algorithm detects a "trend" and performs a "historical trend comparison," which may lead to a conclusion that an off-normal event may be eminent with respect to a production line. Such predictive capability generates a situational awareness for the supervisory team to assess the severity of the prediction and to start a task sequence to manage the situation including "notification" to other stakeholders, for example, but not limited to a general manager (GM), a Sales Manager and/or public relations (PR) manager, if this becomes necessary. An action plan may be created and shared among teams of users for implementation. The execution of this action plan is monitored, controlled and managed by collaborative enterprise process engine 212. Another collaborative feature permits collaboration during root cause analysis, allowing a "Post"

feature to provide additional documents, artifacts (photos, instructions, and notes and "Survey" feature to provide answers from the expert team to assess the situation. Another collaborative feature permits use of a "shared library" for upload of information and documents. Another collaborative feature permits use of a "chat" or "group posting" to keep the production process and the root cause analysis process synchronized until a corrective action team determines an action plan. Another collaborative feature permits the expert team to use a "semantic search" with natural language to search for related incidents historically and across the enterprise—using plain English language like "Show all issues with parts from Supplier XYZ". The strong inherent connection between collaborative enterprise process engine 212 and information engine 130 illustrates many powerful capabilities, for example, "slice and dice" to find out relevant information and "context graph" to instantly display all artifacts, documents including videos, images, drawings, discussion and posts with "relevance ranking." Another collaborative feature permits all stakeholders within the overall supply chain to be "notified" through a "post" (via an automatic push channel). Other stakeholders having permanent subscription also receive automatic notifications on update, which may trigger a chain of social collaborative events within the global supply chain. Another collaborative feature permits a corrective Action and Post-Incident Collaboration: Team to "share" the corrective action plan to relevant players and request their feedback as "survey". The acceptance rate can be published or "posted" among the community for further comments and feedbacks. This can lead to other technical, operational as well as social events in the enterprise.

Figure 4:
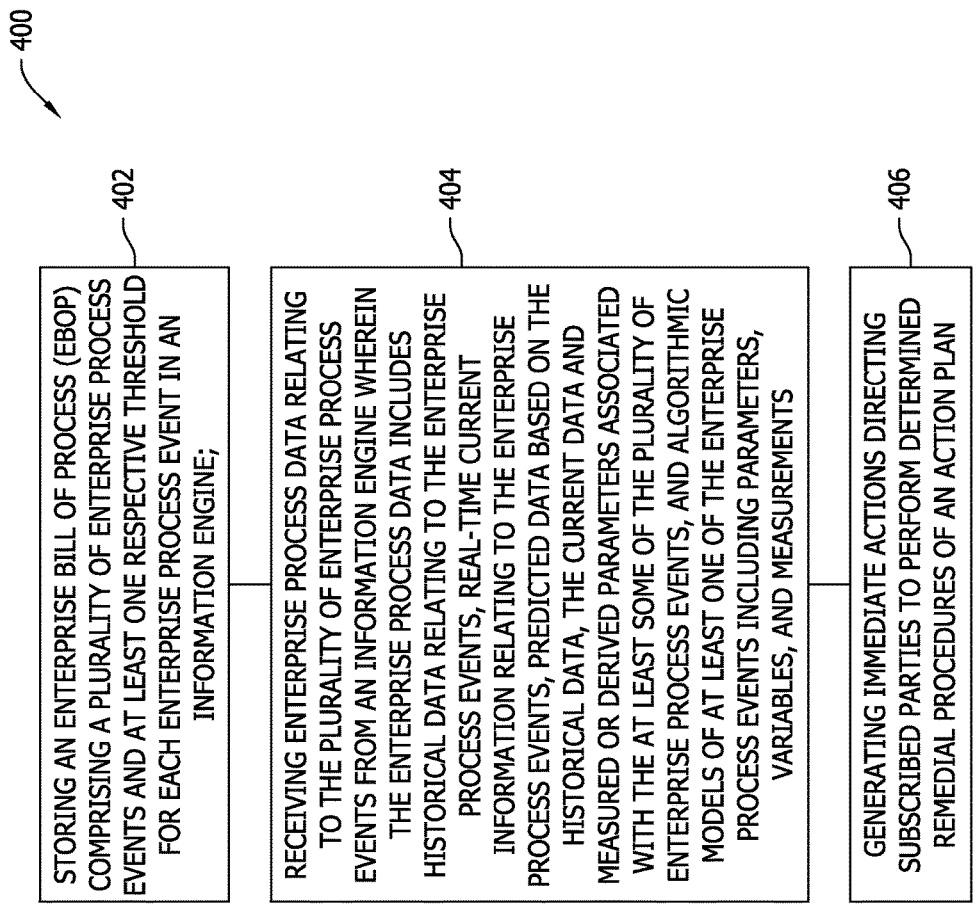

FIG. 4 is a flow chart of a computer-implemented method 400 for organizing management information within an enterprise in accordance with an example embodiment of the present disclosure. Method uses a computing device having a processor and a memory. In the example embodiment, method 400 includes storing 402 an enterprise bill of process (eBOP) comprising a plurality of enterprise process events and at least one respective threshold for each enterprise process event in an information engine and receiving 404 enterprise process data relating to the plurality of enterprise process events from an information engine. The enterprise process data includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. Method 400 also includes generating 406 immediate actions directing subscribed parties to perform determined remedial procedures of an action plan.

Figure 5:
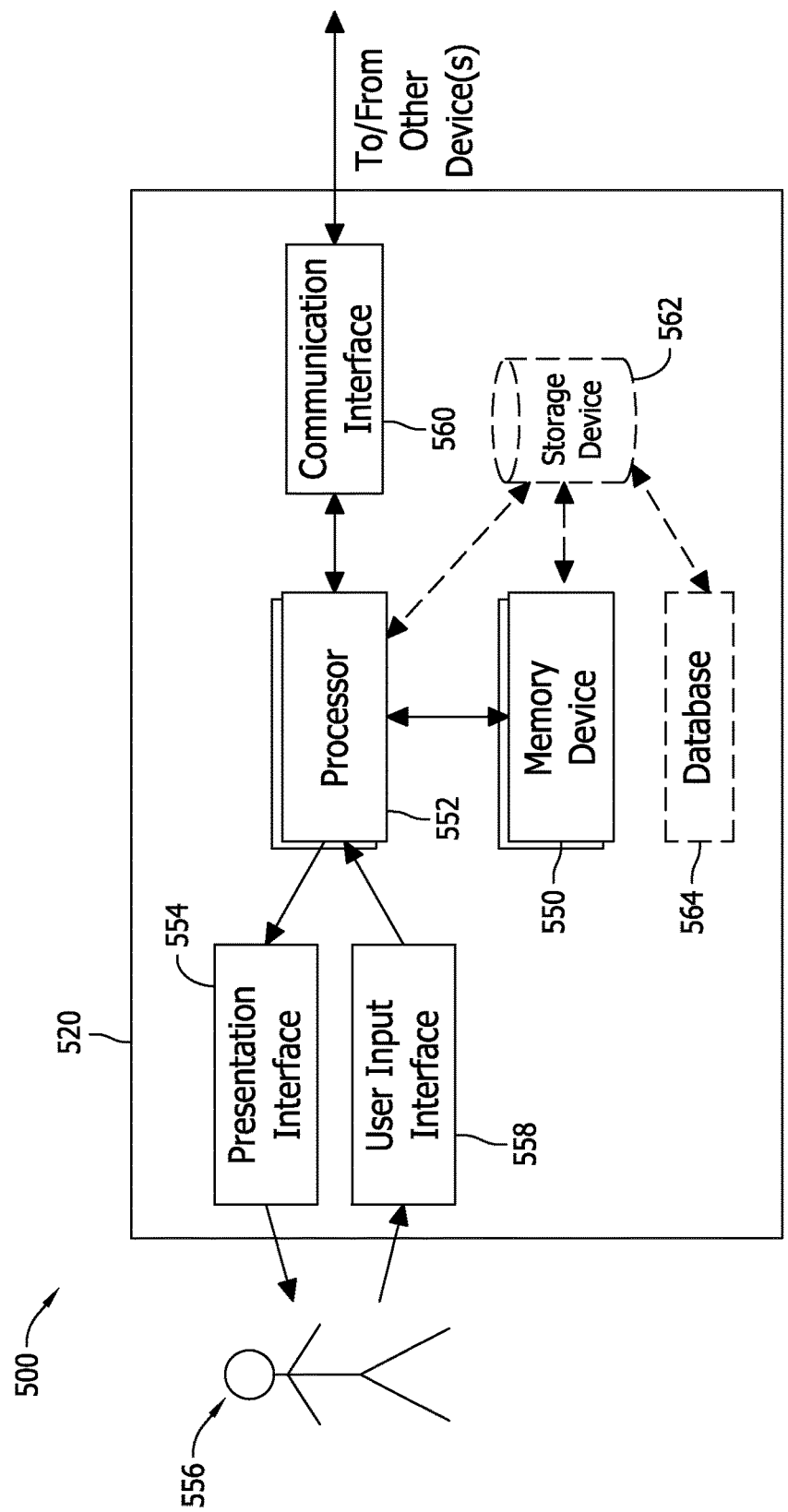

FIG. 5 is a block diagram 500 of an exemplary intelligent enterprise bill-of-process (IEBOP) system 520 used to facilitate communication of enterprise process data between managers of various entities within an enterprise. In the exemplary embodiment, IEBOP system 520 facilitates constructing enterprise process information in data structures within a memory device 550 and enables the relevant business-making workflows to be implemented and managed in the global collaborative environment.

In the exemplary embodiment, IEBOP system 520 includes a memory device 550 and a processor 552 operatively coupled to memory device 550 for executing instructions. In some embodiments, executable instructions are stored in memory device 550. IEBOP system 520 is configurable to perform one or more operations described herein by programming processor 552. For example, processor 552 may be programmed by encoding an operation as one or more executable instructions and providing the executable instructions in memory device 550. Processor 552 may include one or more processing units, e.g., without limitation, in a multi-core configuration.

In the exemplary embodiment, memory device 550 is one or more devices that enable storage and retrieval of information such as executable instructions and/or other data. Memory device 550 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

In the exemplary embodiment, memory device 550 may be configured to store a variety of component and module data associated with various components and sub-components in data structures, files, or other memory areas. Further, memory device 550 may also store component relationship data and threshold data, or other machine or process-related data such as shown in FIGS. 1-4.

In some embodiments, IEBOP system 520 includes a presentation interface 554 coupled to processor 552. Presentation interface 554 presents information, such as a user interface and/or an alarm, to a user 556. For example, presentation interface 554 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 554 includes one or more display devices. In addition, or alternatively, presentation interface 554 may include an audio output device (not shown), e.g., an audio adapter and/or a speaker.

In some embodiments, IEBOP system 520 includes a user input interface 558. In the exemplary embodiment, user input interface 558 is coupled to processor 552 and receives input from user 556. User input interface 558 may include, for example, a keyboard, a pointing device, a mouse, a stylus, and/or a touch sensitive panel, e.g., a touch pad or a touch screen. A single component, such as a touch screen, may function as both a display device of presentation interface 554 and user input interface 558.

In the exemplary embodiment, a communication interface 560 is coupled to processor 552 and is configured to be coupled in communication with one or more other devices such as, another computing system, or any device capable of accessing IEBOP system 520 including, without limitation, a portable laptop computer, a personal digital assistant (PDA), and a smart phone. Communication interface 560 may include, without limitation, a wired network adapter, a wireless network adapter, a mobile telecommunications adapter, a serial communication adapter, and/or a parallel communication adapter. Communication interface 560 may receive data from and/or transmit data to one or more remote devices. IEBOP system 520 may be web-enabled for remote communications, for example, with a remote desktop computer (not shown).

In the exemplary embodiment, presentation interface 554 and/or communication interface 560 are capable of providing information suitable for use with the methods described herein, e.g., to user 556 or another device. Accordingly, presentation interface 554 and/or communication interface 560 may be referred to as output devices. Similarly, user input interface 558 and/or communication interface 560 are capable of receiving information suitable for use with the methods described herein and may be referred to as input devices.

Further, processor 552 and/or memory device 550 may also be operatively coupled to a storage device 562. Storage device 562 is any computer-operated hardware suitable for storing and/or retrieving data, such as, but not limited to, data associated with a database 164. In the exemplary embodiment, storage device 562 is integrated in IEBOP system 520. For example, IEBOP system 520 may include one or more hard disk drives as storage device 562. Moreover, for example, storage device 562 may include multiple storage units such as hard disks and/or solid state disks in a redundant array of inexpensive disks (RAID) configuration. Storage device 562 may include a storage area network (SAN), a network attached storage (NAS) system, and/or cloud-based storage. Alternatively, storage device 562 is external to IEBOP system 520 and may be accessed by a storage interface (not shown).

Moreover, in the exemplary embodiment, database 564 contains a variety of static and dynamic operational data associated with components, modules, machines and processes.

The embodiments illustrated and described herein as well as embodiments not specifically described herein but within the scope of aspects of the disclosure, constitute exemplary means for managing enterprise process data, communication and organization. For example, IEBOP system 520, and any other similar computer device added thereto or included within, when integrated together, include sufficient computer-readable storage media that is/are programmed with sufficient computer-executable instructions to execute processes and techniques with a processor as described herein. Specifically, IEBOP system 520 and any other similar computer device added thereto or included within, when integrated together, constitute an exemplary means for managing enterprise process data, communication and organization.

Figure 6:
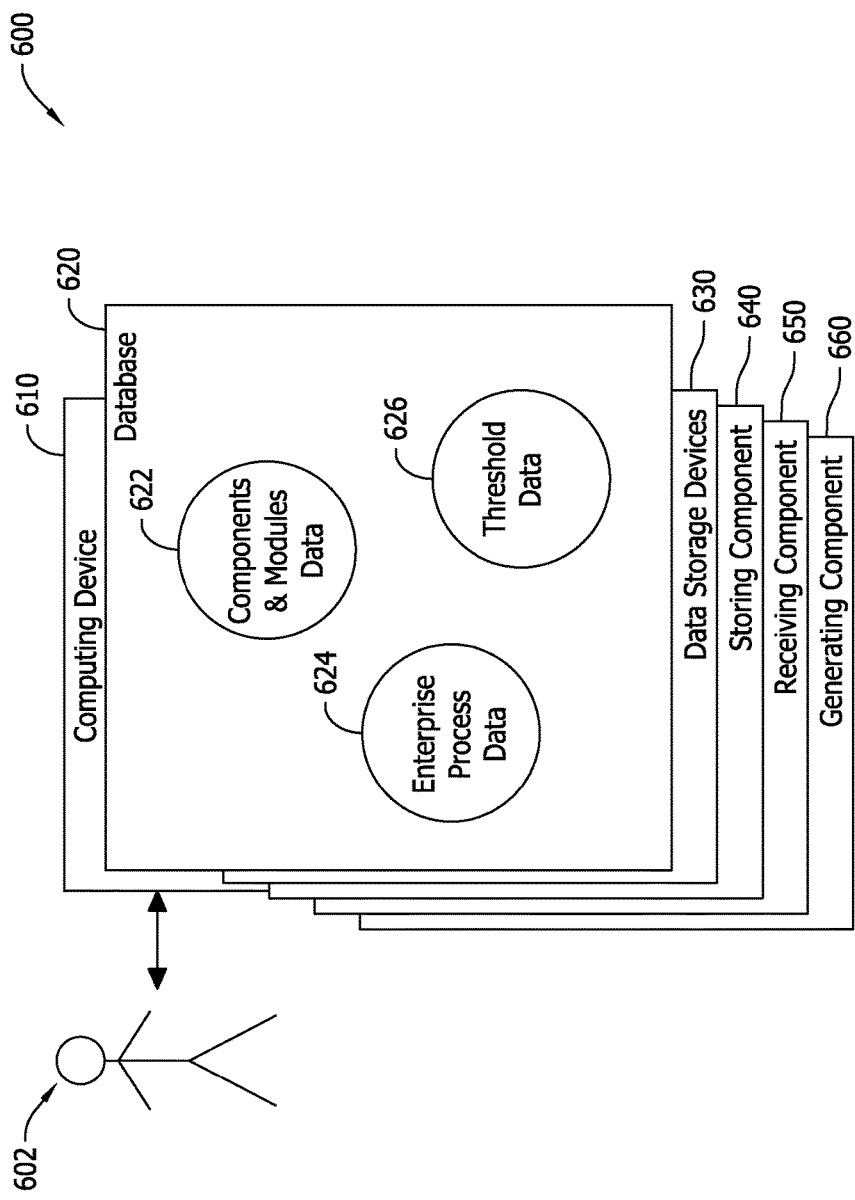

FIG. 6 shows an exemplary configuration 600 of a database 620 within a computing device 610, along with other related computing components, that may be used for organizing management information within an enterprise. In some embodiments, computing device 610 is similar to IEBOP system 520 (shown in FIG. 5). Database 620 is coupled to several separate components within computing device 610, which perform specific tasks.

In the exemplary embodiment, database 620 includes components and modules data 622, enterprise process data 624, and threshold data 626. In some embodiments, database 620 is similar to database 564 (shown in FIG. 5). Components and modules data 622 includes information associated with design components and modules as described above in reference to FIGS. 1-4. Enterprise process data 624 includes historical data relating to the enterprise process events, real-time current information relating to the enterprise process events, predicted data based on the historical data, the current data and measured or derived parameters associated with the at least some of the plurality of enterprise process events, and algorithmic models of at least one of the enterprise process events including parameters, variables, and measurements. Threshold data 626 includes data associated with limits and computational bounds of any of the enterprise process data.

Computing device 610 includes the database 620, as well as data storage devices 630. Computing device 610 includes a storing component 640 for storing an enterprise bill of process (eBOP) comprising a plurality of enterprise process events and at least one respective threshold for each enterprise process event in an information engine. Computing device 610 also includes a receiving component 650 for receiving enterprise process data relating to the plurality of enterprise process events from the information engine. Computing device 610 also includes a generating component 660 for generating immediate actions directing subscribed parties to perform determined remedial procedures of an action plan. An analysis component is also included for processing aspects of generating the immediate actions and/or action plan as described above.

As will be appreciated based on the foregoing specification, the above-described embodiments of the disclosure may be implemented using computer programming or engineering techniques including computer software, firmware, hardware or any combination or subset thereof, wherein the technical effect is a system for managing enterprise process data, communication and organization. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-able medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

At least one of the technical problems addressed by this system includes: (i) excellent collaborative enterprise business decision management and (ii) holistic lean approach for enterprise management. Other technical problems addressed by the system and methods described herein may include increased computer processing due to unnecessary components appearing in the system, thus slowing down the computer.

The methods and systems described herein may be implemented using computer programming or engineering techniques including computer software, firmware, hardware, or any combination or subset thereof, wherein the technical effects may be achieved by performing at least one of the following steps: (a) storing an enterprise bill of process (eBOP) comprising a plurality of enterprise process events and at least one respective threshold for each enterprise process event in an information engine; (b) receiving enterprise process data relating to the plurality of enterprise process events from an information engine; and (c) generating immediate actions directing subscribed parties to perform determined remedial procedures of an action plan.

The resulting technical effect achieved by this system is at least one of reducing computational requirements for maintaining organized management information within an enterprise by, for example, using active retrieval of data, analyzing the data based on successive states of the enterprise, subscribing users interested in the data and analysis, and providing the data and analysis to the subscribed users, and thus a reduced burden on the computer.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for manufacturing a product within an enterprise, said method using a computing device having a processor and a memory, said method comprising:
    storing an enterprise bill of process (eBOP) comprising a plurality of enterprise process event monitors and at least one respective threshold for each enterprise process event monitor in an information engine, the enterprise process event monitor communicatively coupled through a data acquisition system (DAS) to a machine or process involved with manufacturing the product;
    receiving enterprise process data relating to the plurality of enterprise process event monitors from the information engine, said enterprise process data including:
        historical data relating to the plurality of enterprise process events associated with manufacturing the product that are being monitored by a respective enterprise process event monitor;
        real-time current data relating to the plurality of enterprise process events associated with the machine or process involved with manufacturing the product;
        predicted data based on the historical data, the current data and measured or derived parameters associated with the at least some of the plurality of enterprise process events; and
        predictive algorithmic models of at least one of the plurality of enterprise process events including parameters, variables, and measurements;
    communicating the enterprise process data between enterprise process event monitors and the information engine of the enterprise;
    determining, by the predictive algorithm model, a trend in the received enterprise process data;
    performing a historical trend comparison to determine that an off-normal event is eminent;
    generating immediate actions based on the predictive algorithmic models directing subscribed parties to perform determined remedial procedures of an action plan, the immediate actions are preplanned responses to off-normal or errant behavior of one or more of machines and processes;
    receiving a status of implementation of previously transmitted immediate actions from the subscribed parties directed to perform the determined remedial procedures of the action plan;
    harmonizing the received status of implementation of previously transmitted immediate actions into harmonized closed-loop feedback information;
    providing the harmonized closed-loop feedback information to the associated enterprise process event monitor based on the received status of the implementation of the previously transmitted immediate actions;
    modifying the previously transmitted immediate actions into updated immediate actions based on the received status; and
    transmitting updates of the status of the implementation of the previously transmitted immediate actions and the updated immediate actions to the enterprise information engine and subsequently notifying subscribed parties of the updates and the updated immediate actions.

2. The computer-implemented method of claim 1, wherein storing a plurality of enterprise process events and at least one respective threshold for each enterprise process event comprises receiving a plurality of enterprise process events that include at least one production process event, a maintenance process event, a quality process event, a warehouse process event, a logistic process event, a labor process event, a safety process event, and a security process event.

3. The computer-implemented method of claim 1, further comprising receiving subscription information from enterprise parties for each enterprise process event that the enterprise parties are to be informed of.

4. The computer-implemented method of claim 3, further comprising transmitting, to the enterprise parties, information relating to the plurality of enterprise process events for which the enterprise parties are subscribed and which have exceeded a respective threshold value.

5. The computer-implemented method of claim 4, wherein transmitting, to the enterprise parties, information relating to the plurality of enterprise process events for which the enterprise parties are subscribed and which have exceeded a respective threshold value comprises transmitting at least one of immediate actions directing subscribed parties to perform determined remedial procedures of an action plan, status of implementation of previously transmitted immediate actions, and request for a recommendation to modify the previously transmitted immediate actions.

6. The computer-implemented method of claim 1, wherein receiving enterprise process data relating to the plurality of enterprise process events from an information engine comprises receiving in real-time production process data, a maintenance process data, a quality process data, a warehouse process data, a logistic process data, a labor process data, a safety process data, and a security process data from a plurality of entities within the enterprise, wherein the plurality of entities includes third party contractors to the enterprise.

7. The computer-implemented method of claim 1, wherein storing a plurality of enterprise process events and at least one respective threshold comprises storing a plurality of activities performed by one of a plurality of entities within the enterprise with a purpose of achieving one or more business goals.

8. The computer-implemented method of claim 1, wherein storing a plurality of enterprise process events and at least one respective threshold comprises storing one or more thresholds associated with each of a plurality of activities performed by one of a plurality of entities within the enterprise with a purpose of achieving one or more business goals, the one or more thresholds related to an ability of the respective entity to meet each of the one or more thresholds in a predetermined amount of time.

9. The computer-implemented method of claim 1, wherein receiving enterprise process data relating to the plurality of enterprise process events from an information engine comprises generating at least one analytics cell associated with each of the plurality of enterprise process events.

10. The computer-implemented method of claim 9, wherein generating at least one analytics cell associated with each of the plurality of enterprise process events comprises generating an analytics cell for each machine or process included within a respective enterprise process event.

11. The computer-implemented method of claim 1, wherein generating an analytics cell comprises generating an analytics cell configured to monitor an operation of an associated machine, analyze the monitored operation based on analytic rules received from at least one of an information engine and an eBOP supervisory engine.

12. An intelligent enterprise bill-of-process (eBOP) system comprising an embedded analytics cell, said system comprising one or more processors communicatively coupled to one or more memory devices, said one or more memory devices including computer-executable instructions that when executed by the one or more processors cause the one or more processors to perform the following steps:
   store an enterprise bill of process (eBOP) comprising a plurality of enterprise process events associated with manufacturing a product and at least one respective threshold for each enterprise process event in an information engine, the eBOP stored in a business objects database;
   receive enterprise process data from an information engine, the enterprise process data relating to the plurality of enterprise process events, said enterprise process data includes:
      historical data relating to the plurality of enterprise process events;
      real-time current data relating to the plurality of enterprise process events;
      predicted data based on the historical data, the current data and measured or derived parameters associated with the at least some of the plurality of enterprise process events; and
      predictive algorithmic models of at least one of the plurality of enterprise process events including parameters, variables, and measurements;
   determine, by the predictive algorithm model, a trend in the received enterprise process data,
   perform a historical trend comparison to determine that an off-normal event is eminent;
   generate immediate actions that direct subscribed parties to perform determined remedial procedures of an action plan;
   receive reports from the subscribed parties of progress of implementation of the action plan;
   provide harmonized closed-loop feedback to an associated enterprise process event monitor based on the received reports; and
   report updates to a status of the implementation of the previously transmitted immediate actions to an enterprise information engine and subsequently notifying subscribed parties of the updates.

13. The system of claim 12, wherein the computer-executable instructions further cause the processor to receive a plurality of enterprise process events that include at least one production process event, a maintenance process event, a quality process event, a warehouse process event, a logistic process event, a labor process event, a safety process event, and a security process event.

14. The system of claim 12, wherein the computer-executable instructions further cause the processor to receive subscription information from enterprise parties for each enterprise process event that the enterprise parties are to be informed of.

15. The system of claim 12, wherein the computer-executable instructions further cause the processor to receive in real-time production process data, a maintenance process data, a quality process data, a warehouse process data, a logistic process data, a labor process data, a safety process data, and a security process data from a plurality of entities within the enterprise, wherein the plurality of entities includes third party contractors to the enterprise.

16. The system of claim 12, wherein the computer-executable instructions further cause the processor to receive storing a plurality of activities performed by one of a plurality of entities within the enterprise with a purpose of achieving one or more business goals.

17. One or more non-transitory computer-readable storage media having computer-executable instructions embodied thereon, wherein when executed by at least one processor, the computer-executable instructions cause the processor to:
   store an enterprise bill of process (eBOP) comprising a plurality of enterprise process events associated with manufacturing a product and at least one respective threshold for each enterprise process event in an information engine, the eBOP stored in a business objects database;
   receive enterprise process data from an information engine, the enterprise process data relating to the plurality of enterprise process events, said enterprise process data includes:
      historical data relating to the plurality of enterprise process events;
      real-time current data relating to the plurality of enterprise process events;
      predicted data based on the historical data, the current data and measured or derived parameters associated with the at least some of the plurality of enterprise process events; and
      predictive algorithmic models of at least one of the plurality of enterprise process events including parameters, variables, and measurements; and
   communicate the enterprise process data between enterprise process event monitors and the enterprise information engine;
   determine, by the predictive algorithm model, a trend in the received enterprise process data,
   perform a historical trend comparison to determine that an off-normal event is eminent;

generate immediate actions that direct subscribed parties to perform determined remedial procedures of an action plan;

receive a status of implementation of previously transmitted immediate actions from the subscribed parties directed to perform the determined remedial procedures of the action plan;

provide closed-loop feedback to the associated enterprise process event monitor based on the received status of the implementation of the previously transmitted immediate actions, the closed-loop feedback harmonized to the needs of the subscribed parties; and report updates to a status of the implementation of the previously transmitted immediate actions to the enterprise information engine and subsequently notifying subscribed parties of the updates.

18. The computer-readable storage media of claim 17, wherein the computer-executable instructions further cause the processor to generate at least one analytics cell associated with each of the plurality of enterprise process events.

19. The computer-readable storage media of claim 18, wherein the computer-executable instructions further cause the processor to generate an analytics cell for each machine or process included within a respective enterprise process event.

20. The computer-readable storage media of claim 18, wherein the computer-executable instructions further cause the processor to generate an analytics cell configured to monitor an operation of an associated machine, analyze the monitored operation based on analytic rules received from at least one of an information engine and an eBOP supervisory engine.

* * * * *